United States Patent [19]
Kotzin

[11] Patent Number: 5,113,394
[45] Date of Patent: May 12, 1992

[54] METHOD FOR REPEATING TDM/TDMA FRAMES

[75] Inventor: Michael D. Kotzin, Buffalo Grove, Ill.

[73] Assignee: Motorola, Inc., Schaumburg, Ill.

[21] Appl. No.: 371,476

[22] Filed: Jun. 26, 1989

[51] Int. Cl.⁵ .............................................. H04J 3/06
[52] U.S. Cl. .......................................... 370/97; 375/3
[58] Field of Search ....................... 370/97, 58, 59, 61; 455/12, 13, 16; 375/3

[56] References Cited

U.S. PATENT DOCUMENTS

| | | | |
|---|---|---|---|
| 4,381,562 | 4/1983 | Acampora | 370/97 |
| 4,742,514 | 5/1988 | Goode | 370/97 |
| 4,845,710 | 7/1989 | Nakamura et al. | 370/58 |

Primary Examiner—Douglas W. Olms
Assistant Examiner—C. Edwards
Attorney, Agent, or Firm—Wayne J. Egan

[57] ABSTRACT

An improved method for repeating TDM/TDMA frames in a trunked wide area network environment is disclosed that repeats a user's inbound information during the same time slot the user is assigned for transmit, yet minimizes the added bulk audio delay. According to the invention, the last portion of the inbound information received in a previously-received time slot is combined with all but the end of the currently-received slot for repeating during the currently-received time slot. The information received at the end of the current time slot is stored for repeating during the next assigned inbound time slot period. This method provides a timing technique that allows for wide area networking of TDM trunking systems, yet without incurring excess added bulk audio delay and maintaining all the features of TDM. A typical repeater embodying this method is also described.

24 Claims, 3 Drawing Sheets

METHOD FOR REPEATING TDM/TDMA FRAMES

Technical Field

This application relates to a time division multiplexing (TDM) repeater method for supporting wide area networking of trunked radio systems.

BACKGROUND OF THE INVENTION

Time division multiplexing/time division multiple access (TDM/TDMA) repeater systems are known. Such systems are characterized by an inbound channel, utilized by a multiplicity of users, each of which being permitted the use of one or more non-overlapping time periods (slots) in which to transmit information. A continuous outbound channel exists, also time slotted to facilitate segregation of information directed to the various users, wherein at least some of the outbound transmitted information is derived from the received inbound information.

The use of the aforementioned TDM/TDMA approach to provide widearea coverage trunking radio systems is also known. The requirements for these systems are great. On the one hand, it is desired to provide the variety of system configurations potentially necessary to provide wide area networked coverage, including satellite receivers, simulcast, etc. This may involve compensating for considerable delay in the system infrastructure. On the other hand, it is desired to maintain all the features of TDM including multi-radio capabilities such as full duplex, voice plus data, conferencing, priority monitor, emergency preemption, etc. Furthermore, system capacity and performance should not be compromised.

A key problem is that of minimizing the bulk audio delay through the entire system. Excess delay introduces a confusion factor and reduces communications efficiency and user acceptance. The use of TDM already may introduce a substantial fixed amount of delay due to a relatively large RF channel framing such as, for example, 250 msec one-way. Thus, it is particularly important to minimize any additional delay introduced by any scheme for networking sites.

The basic goals of a repeater in any wide area networked radio trunking system are as follows: For any transmitter node, it is desired to repeat a user's information that is somehow obtained from one or more signals either received at that node or received via alternate communications paths from potentially numerous other remote nodes throughout the network. The added audio delay should be as small as possible. In a multiple user TDM/TDMA system, there should also be no impact on the features or capabilities of the basic single-site TDM system. A key advantage of certain TDM/TDMA systems, however, is that a subscriber can transmit during one time slot and have all the other time slots available for reception to provide features such as receiving simultaneous data, monitoring the control channel (slot) for various purposes, conferencing, full duplex, and so forth. This requirement precludes the approach of shifting the outbound repeater timing relative to the inbound timing, since an overlap zone is formed that prevents subscriber reception of all the other outbound slots while transmitting, thereby limiting some of the TDM system features. Thus, it is desirable that the transmitter output TDM framing from all the nodes should be such that one user's information is repeated essentially coincident with when that same user is being received. Means for combining multiple signals from satellite receivers for retransmission is well known in the art. Likewise, introduction of infrastructure delay to align the timing of signals for simulcast retransmission is also well known.

In the past, several schemes have been used to achieve this desired synchronization.

One scheme has introduced additional guard time at the end of each inbound slot. The outbound slots are synchronized to the inbound frame and the received information is repeated slightly delayed in time within the same frame time slot. The impact of having to repeat this frame at a remote node is that the guard time must be increased to allow for the maximum backbone delay incurred from any receiver site to any transmitter in the network. The obvious disadvantage of this approach is that it would require such a substantial increase in propagation allowance that the channel capacity would be greatly diminished.

A second approach likewise provides coincident inbound and outbound frames. Information received during a first slot is delayed for retransmission during a later slot. The main problem with this approach is that the additional incurred delay, over and above the basic TDM/speech coding delay, can be quite large. At least one full time slot's information, representing a frames worth of speech, is required to be received even if the next adjacent slot is used to repeat the inbound slot.

As a result, there is a need for an improved method for repeating TDM/TDMA frames in a trunked wide area network environment.

SUMMARY OF THE INVENTION

It is an object of the invention to provide an improved method for repeating TDM/TDMA frames in a trunked wide area coverage radio network environment. Accordingly, an improved method for repeating TDM/TDMA frames is disclosed that repeats inbound information generally coincident or synchronized with the time that information is being received, yet minimizes the added bulk delay. In essence, the last part of the inbound information received in a previously received time slot is combined with all but the end of the currently received slot for repeating during the time of the currently received time slot. The information received at the end of the current time slot is "held over" for repeating or retransmission during the next assigned inbound time slot period. This method provides a timing technique that allows for wide area networking of TDM radio systems and maintaining all the features of TDM, yet without incurring excess added bulk delay.

DETAILED DESCRIPTION OF THE INVENTION

Figure 1:
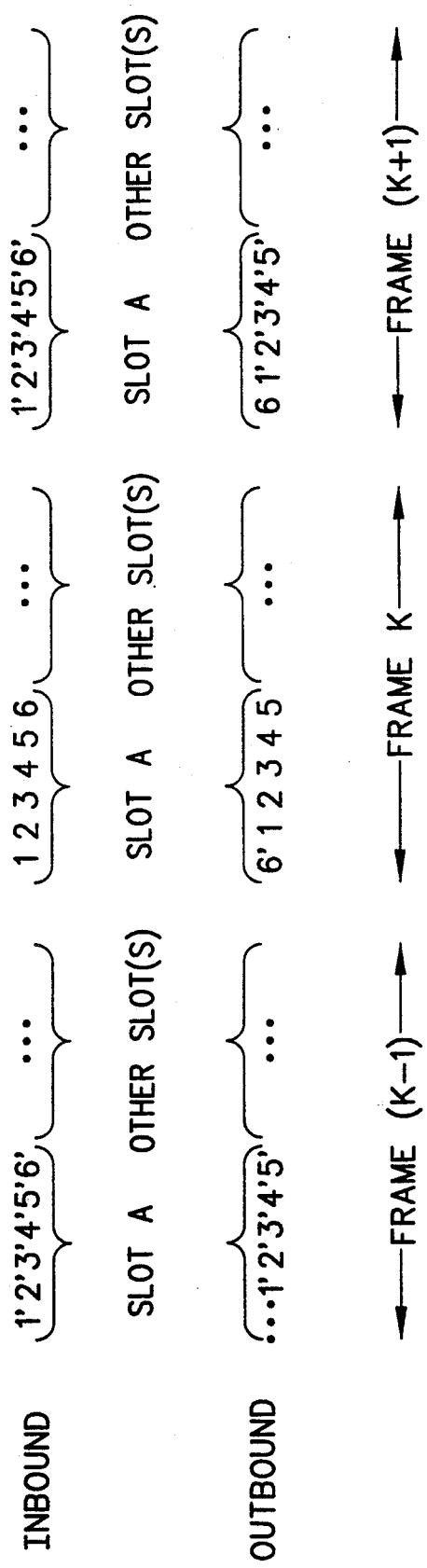
FIG. 1 is a timing diagram that shows a first embodiment of a method for repeating TDM/TDMA frames, according to the invention.

FIG. 1 is a timing diagram that shows a first embodiment of a method for repeating TDM/TDMA frames, according to the invention.

There is shown on the top three consecutive inbound frames, designated for convenience inbound frame (k−1), inbound frame k, and inbound frame (k+1). Also is shown the corresponding three consecutive outbound frames, designated for convenience outbound frame (k−1), outbound frame k, and outbound frame (k+1). Note that each frame contains a plurality of slots, herein the initial or first slot designated slot A. Also note that each slot contains a plurality of message segments, herein six.

For purposes of demonstrating the first embodiment, it is assumed that inbound frame (k−1) slot A contains the following message segments: 1', 2', 3', 4', 5', and 6'. Also, it is assumed that inbound frame k slot A contains the following message segments: 1, 2, 3, 4, 5, and 6. Finally, it is assumed that inbound frame (k+1) contains the following message segments: 1', 2', 3', 4', 5', and 6'.

In FIG. 1, it is assumed that conventional approaches for handling TDM/TDMA radio trunking system synchronization and control are provided and, therefore, they are not shown. For example, the use of synchronization patterns may be provided within the inbound slot to facilitate the base repeater's synchronizing to the received inbound slot. There may also be inbound control and/or date information. The repeater may locally generate synchronization patterns, control and/or data to combine with the user information to comprise the complete transmitted outbound slot. For the purposes of describing this invention, it is only necessary to consider the actual repeated information format.

For a typical speech example, each TDM frame might be 240 msec long with 4 slots per frame. With this arrangement, each inbound and outbound slot may contain 6 message segments, each representing 40 msec of speech, for a total of 240 msec. While this example uses message segments of uniform length for speech, other configurations are also possible. In fact, it will be appreciated that the message segments may be of non-uniform length and may transport a variety of information types using various coding schemes. It will also be appreciated that each frame may contain as few as two slots, and each slot may contain as few as two message segments.

As shown by FIG. 1, each outbound slot includes all the message segments of the corresponding inbound slot except for the final message segment, which is saved. The saved message segment is then sent as the initial message segment of the succeeding outbound frame slot. Thus, only the last slot is delayed (saved) for subsequent repeating (retransmission). It will be appreciated, however, that instead of saving the last (individual) message segment, the last two (or some other number of) message segments could be saved or delayed.

Consider frame (k−1) in FIG. 1. Inbound frame (k−1) slot A contains message segments 1' through 6'. Note the corresponding outbound frame (k−1) slot A contains message segments 1' through 5' only. Therefore, the message segment 6' is not sent during frame (k−1), and is saved for the succeeding frame k.

Now consider frame k. Inbound frame k slot A contains message segments 1 through 6. Message segment 6', however, has been saved from the previous frame (k−1) and now must be sent as the first segment of outbound frame k slot A. The current inbound message segments 1 through 5 are now repeated as outbound segments. As a result, the current slot A message segment 6 is not sent during frame k, and is saved for the succeeding frame (k+1).

Now consider frame (k+1), wherein slot A contains inbound message segments 1' through 6'. As before, however, the saved message segment 6 from the previous frame is the first outbound message segment to be sent in slot A in this frame. Inbound message segments 1' through 5' are then sent as outbound segments, leaving the current slot A message segment 6' to be saved for the next frame.

The advantage of the disclosed technique is that it can be used to compensate for infrastructure delay between the receive and transmit paths. For the particular example and numbers given above, up to 10 msec of infrastructure delay is accommodated with the incurring of only 40 msec of actual additional audio delay. Greater infrastructure delay can be accommodated by using multiple message segments, longer message segments (e.g. by repartitioning or combining), etc.

Figure 2:
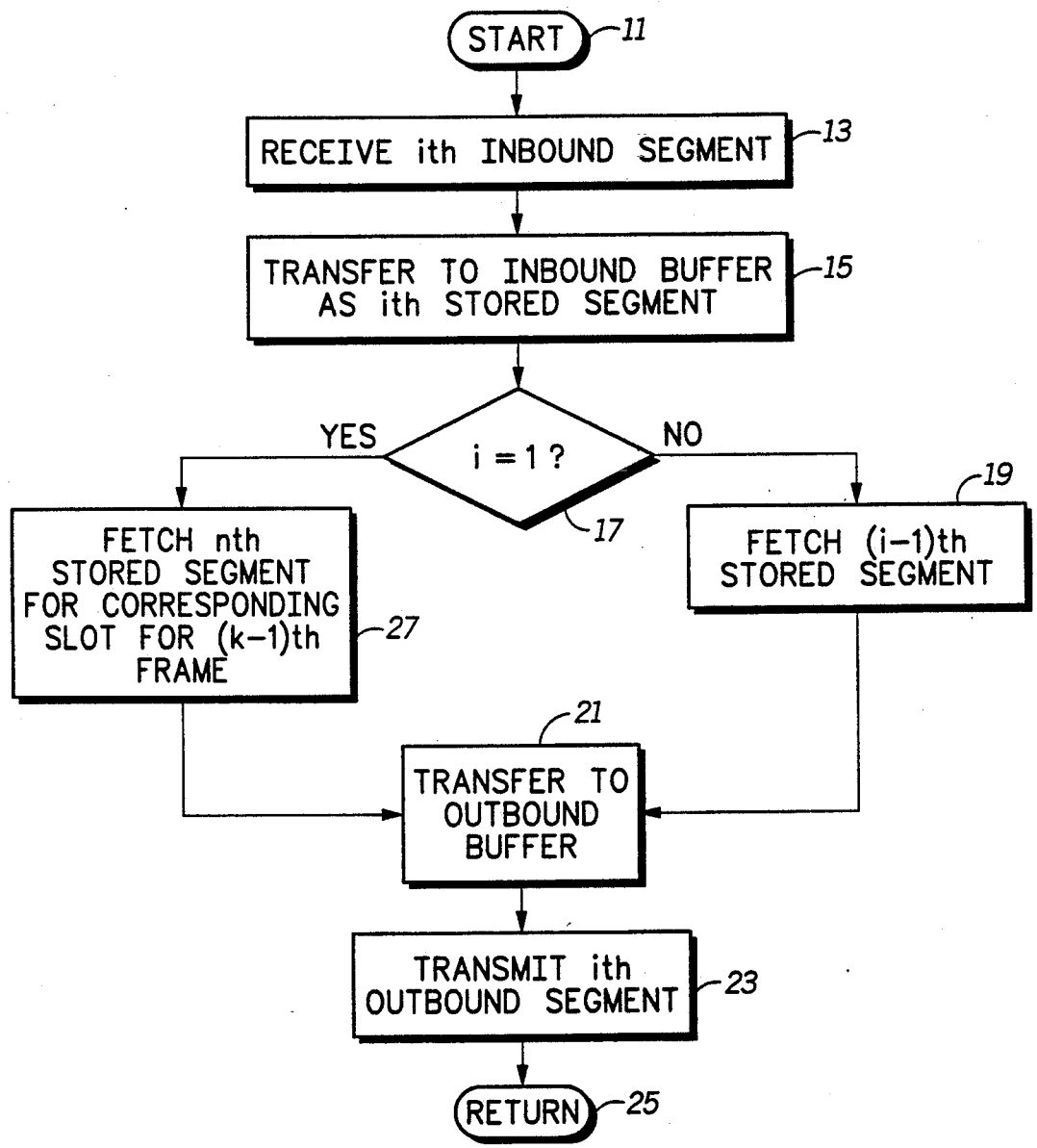
FIG. 2 shows a typical flow diagram for the first embodiment.

FIG. 2 shows a typical flow diagram for the first embodiment. It is assumed the current frame is numerically the kth frame, and that each slot has n message segments, and that the ith message segment is currently being received.

The process starts at step 11, and then proceeds to step 13, wherein the ith inbound message segment is received. The process next goes to step 15, where the received segment is transferred to an inbound buffer as the ith stored segment. The process next decides whether this is the first message segment of the current slot to be received or, numerically, whether i=1, step 17. If the answer to this determination is negative, then the process recalls, or fetches, the (i−1)th stored segment from the inbound buffer, step 19, and transfers it to an outbound buffer, step 21. The process now transmits the current outbound segment from the outbound buffer, step 23, and returns, step 25.

Now assume that the current received message segment is the first to be received for the current slot. In this case, at step 17, the process will affirm that i=1, and will go to step 27. Here the process retrieves, or fetches, the nth stored segment for the corresponding slot of the previous frame (k−1) from the inbound buffer, and transfers it to the outbound buffer step 21. The process now continues as above.

As mentioned above, the result of this process is that, at the end of the current slot, the nth received segment is left over, or saved, to be transmitted as the initial outbound message segment of the corresponding slot of the next (successive) frame. Similar to above, it will be appreciated that while FIG. 2 depicts saving only the last individual nth segment, the last few final segments (such as two or more) could be saved.

Figure 3:
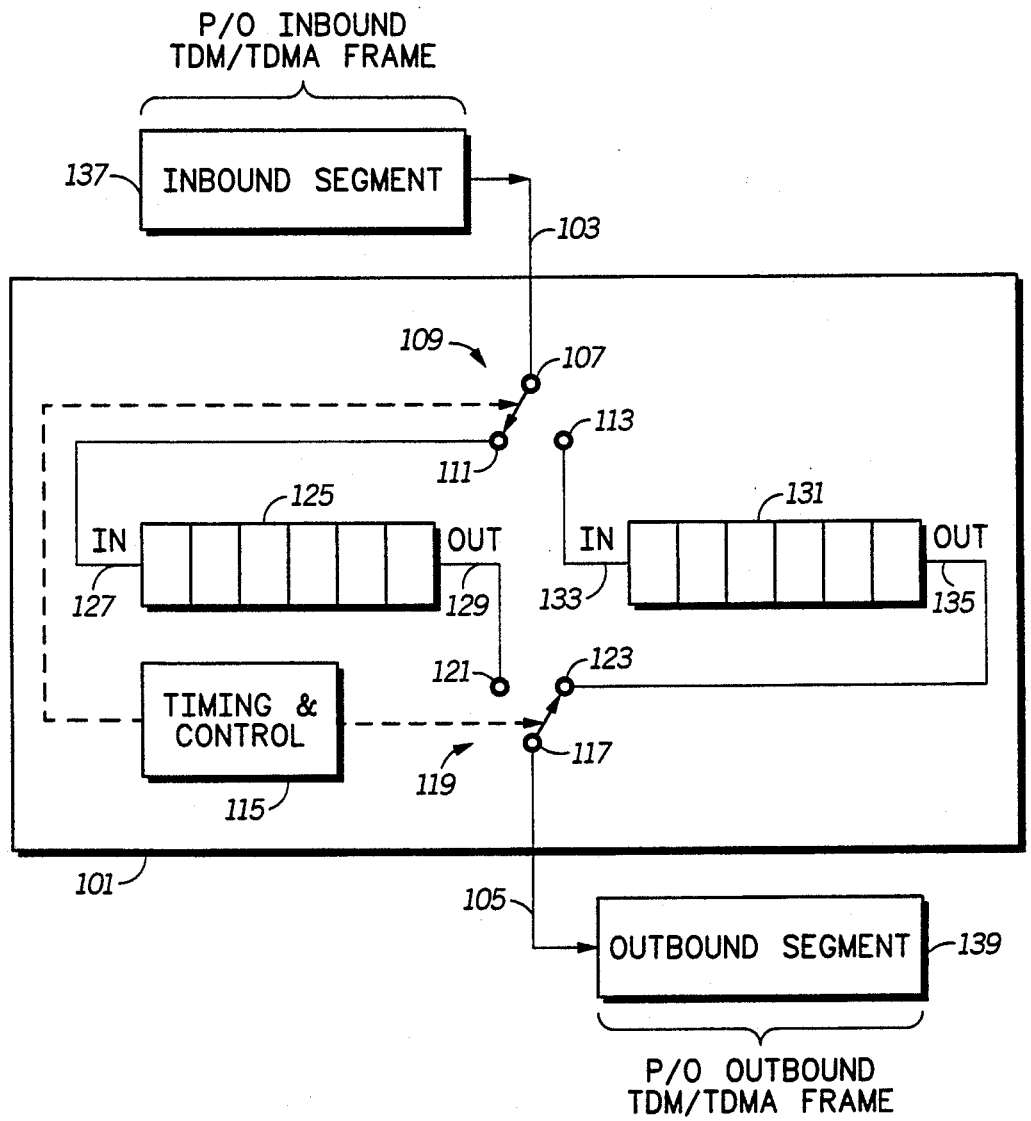
FIG. 3 shows a typical repeater for practising the first embodiment.

FIG. 3 shows a typical implementation of a repeater for practising the first embodiment.

Referring now to FIG. 3, there is shown a repeater 101 with an input 103 and an output 105. The input 103 is connected to a common input 107 of a first two-position switch 109. The switch 109 has a first output 111 and a second output 113, and is controlled by a suitable timing and control circuit 115 such as a digital signal processor (DSP) or a suitably-programmed microprocessor.

The output 105 is connected to a common output 117 of a second two-position switch 119 with a first input 121 and a second input 123. The switch 119 is likewise controlled by the timing and control circuit 115.

The repeater 101 also includes a first information buffer 125 whose input 127 is connected to the first output 111 of the first switch 109 and whose output 129 is connected to the first input 121 of the second switch 119. The information buffer acts like a fixed length, clocked shift register. It has a length precisely equal to that of the message segment. The repeater 101 also includes a similar second information buffer 131 whose input 133 is connected to the second output 113 of the first switch 109 and whose output 135 is connected to the second input 123 of the second switch 119.

It should be evident that the first two-position switch 109, when made to connect the common input 107 to the first output 111, may be used to steer the repeater input 103 to the input 127 of the first information buffer 125. Likewise, it should be obvious that the switch 109, when made to connect the common input 107 to the second output 113, may be used to route the repeater input 103 to the input 133 of the second information buffer 131. Thus, by controlling the position of the switch 109, a message segment 137 of an inbound TDM/TDMA frame may be clocked (or written) into either the first information buffer 125 or the second buffer 131.

It should further be evident that the second two-position switch 119, when made to connect the common output 117 to the first input 121, may be used to connect the output 129 of the first information buffer 125 to the repeater output 105. Likewise, it should be clear that the switch 119, when made to connect the common output 117 to the second input 123, may be used to connect the output 135 of the second information buffer 131 to the repeater output 105. Thus, by controlling the position of the switch 119, a message segment 139 of an outbound TDM/TDMA frame may be clocked (or read) from either the first information buffer 125 or the second buffer 131.

Assume now that switch 109 is initially set to connect the repeater input 103 to the input 127 of the first information buffer 125 and that switch 119 is initially set to connect the repeater output 105 to the output 129 of the first information buffer 125.

With the foregoing in mind, it should be obvious that the repeater 101 may be made to function so that a first inbound segment is initially clocked into the first information buffer 125. Thereafter, the switch 109 changes position so the second inbound segment is clocked into the second information buffer 131 whilst the contents of the first information buffer 125 are clocked out as the second outbound segment. Thereafter, the switch 109 and the switch 119 both change position so the third inbound segment is clocked into the first information buffer 125 whilst the contents of the second information buffer 131 are clocked out as the third outbound segment. Thereafter, both switches change position together synchronized with the inbound segments so that, in general, each inbound segment is received and stored (or delayed) for retransmission as the next (or subsequent) outbound segment. At the end of any time slot, the last (most recent) inbound message segment will be saved (or stored) to be sent as the initial outbound message segment for the corresponding time slot for the next (succeeding) frame.

As described herein, this invention provides a timing technique that allows for wide area networking of TDM trunking systems yet without incurring excess added bulk audio delay and maintaining all the inherent features of TDM.

While various embodiments of a method for repeating TDM/TDMA frames, according to the present invention, have been described hereinabove, the scope of the invention is defined by the following claims.

What is claimed is:

1. A TDM/TDMA radio repeater for repeating TDM/TDMA radio frames utilizing consecutive TDM/TDMA radio frames, said radio repeater having means for repeating an inbound TDM/TDMA radio frame based at least in part on the inbound TDM/TDMA radio frame immediately preceding, each inbound TDM/TDMA radio frame comprising p inbound slots, each inbound slot comprising k inbound message segments $i_1$-$i_k$, $i_1$ the first, $i_k$ the last, said means comprising:

means for transmitting an outbound TDM/TDMA radio frame comprising p outbound slots, each outbound slot generally synchronized or coincident with the corresponding inbound slot, each outbound slot comprising k outbound message segments $o_1$-$o_k$, $o_1$ the first, $o_k$ the last, each outbound slot outbound message segment $o_2$-$o_k$ based at least in part on the corresponding inbound slot inbound message segment $i_1$-$i_{k-1}$ of like order so that $o_2$ is based on $i_1$, $o_3$ is based on $i_2$, and so forth, with $o_k$ based on $i_{k-1}$, each outbound slot outbound message segment $o_1$ based at least in part on the corresponding inbound slot inbound message segment $i_k$ of said inbound TDM/TDMA radio frame immediately preceding.

2. The repeater of claim 1 wherein said inbound message segments and said outbound message segments are of essentially uniform length.

3. A TDM/TDMA radio repeater for repeating TDM/TDMA radio frames, said repeater having means for repeating an inbound TDM/TDMA radio frame n based at least in part on the inbound TDM/TDMA radio frame n-1, each inbound TDM/TDMA radio frame comprising p inbound slots, each inbound slot comprising k inbound message segments $i_1$-$i_k$, $i_1$ the earliest, $i_k$ the latest, said means comprising:

means for transmitting responsive to each inbound slot of the inbound frame n-1 an outbound slot comprising k outbound message segments $o_1$-$o_k$, $o_1$ the earliest, $o_k$ the latest, each outbound slot outbound message segment $o_2$-$o_k$ based at least in part on the corresponding inbound message segment $i_1$-$i_{k-1}$ of like order so that $o_2$ is based on $i_1$, $o_3$ is based on $i_2$, and so forth, with $o_k$ based on $i_{k-1}$, and for saving the inbound message segment $i_k$ of each inbound slot of the inbound TDM/TDMA radio frame n-1 to form a saved inbound message segment $i_k$, said means further arranged for transmitting responsive to each inbound slot of the inbound TDM/TDMA radio frame n an outbound slot comprising k outbound message segments $o_1$-$o_k$, outbound message segment $o_1$ based at least in part on said saved inbound message segment $i_k$ of the corresponding inbound slot of the inbound TDM/TDMA radio frame n-1, each outbound slot outbound message segment $o_2$-$o_k$ based at least in part on the corresponding inbound slot inbound message segment $i_1$-$i_{k-1}$ of like order so that $o_2$ is based on $i_1$, $o_3$ is based on $i_2$, and so forth, with $o_k$ based on $i_{k-1}$, and for saving the inbound message segment $i_k$ of each inbound slot of the inbound TDM/TDMA radio frame n to form a saved inbound message segment $i_k$.

4. The repeater of claim 3 wherein said inbound message segments and said outbound message segments are of generally equal length.

5. A TDM/TDMA radio repeater for repeating TDM/TDMA radio frames, said radio repeater having means for repeating an nth inbound TDM/TDMA radio frame based at least in part on the inbound TDM/TDMA radio frame n−1, each inbound TDM/TDMA radio frame comprising multiple slots, each slot comprising k message segments, said means comprising:

means for storing responsive to each inbound slot of the inbound TDM/TDMA radio frame n−1 the last q message segments to form q stored segments, means for sending responsive to each corresponding inbound slot of the inbound TDM/TDMA radio frame n an outbound slot comprising k message segments, the first q segments based at least in part on said q stored segments, the remaining segments based at least in part on the first k-q message segments of the present inbound TDM/TDMA radio frame.

6. The repeater of claim 5 wherein said message segments are of generally equivalent length.

7. The repeater of claim 6 wherein q=1.

8. A TDM/TDMA radio repeater for repeating TDM/TDMA radio frames utilizing inbound and outbound TDM/TDMA radio frames, each TDM/TDMA radio frame comprising multiple slots, each slot comprising several message segments including a most recent message segment, said TDM/TDMA radio repeater having means for repeating inbound slots, comprising:

means for sequentially retransmitting responsive to a typical inbound slot all message segments except a predetermined number of the most recent message segments as outbound message segments and for delaying said predetermined number of the most recent message segments to form a delayed portion;

said means being further arranged for transmitting responsive to an inbound slot subsequent to said typical inbound slot said predetermined number of outbound message segments based on said delayed portion and for sequentially retransmitting all message segments except said predetermined number of the most recent message segments as outbound message segments.

9. The repeater of claim 8 wherein said inbound message segments and said outbound message segments are of substantially uniform length.

10. The repeater of claim 9 wherein said predetermined number equals one.

11. A TDM/TDMA radio repeater for repeating TDM/TDMA radio frames utilizing inbound and outbound TDM/TDMA radio frames, each TDM/TDMA radio frame comprising multiple slots, each slot comprising n segments, each designated segment$_i$, where i varies from 1-n, segment$_n$ the most recent segment, said radio repeater having means for repeating inbound slots, said means comprising:

means for delaying segment$_1$ of the inbound slot k to form a delayed segment$_1$ of the inbound slot k and, where i varies from 2-n, for delaying segment$_i$ of the inbound slot k to form a delayed segment$_i$ of the inbound slot k and for transmitting said delayed segment$_{i-1}$ of the inbound slot k, said means being further arranged for delaying segment$_1$ of the inbound slot k+1 to form a delayed segment$_1$ of the inbound slot k+1 and for transmitting said delayed segment$_n$ of said inbound slot k and, where i varies from 2-n, for delaying segment$_i$ of the inbound slot k+1 to form a delayed segment$_i$ of the inbound slot k+1 and for transmitting said delayed segment$_{i-1}$ of the inbound slot k+1.

12. The repeater of claim 11 wherein said segments are of generally equal length.

13. In a TDM/TDMA radio repeater for repeating TDM/TDMA radio frames utilizing consecutive TDM/TDMA radio frames, a method for repeating an inbound TDM/TDMA radio frame based at least in part on the inbound TDM/TDMA radio frame immediately preceding, each inbound TDM/TDMA radio frame comprising p inbound slots, each inbound slot comprising k inbound message segments $i_1$-$i_k$, $i_1$ the first, $i_k$ the last, comprising:

transmitting an outbound TDM/TDMA radio frame comprising p outbound slots, each outbound slot generally synchronized or coincident with the corresponding inbound slot, each outbound slot comprising k outbound message segments $o_1$-$o_k$, $o_1$ the first, $o_k$ the last, each outbound slot outbound message segment $o_2$-$o_k$ based at least in part on the corresponding inbound slot inbound message segment $i_1$-$i_{k-1}$ of like order so that $o_2$ is based on $i_1$, $o_3$ is based on $i_2$, and so forth, with $o_k$ based on $i_{k-1}$, each outbound slot outbound message segment $o_1$ based at least in part on the corresponding inbound slot inbound message segment $i_k$ of said inbound TDM/TDMA radio frame immediately preceding.

14. The method of claim 13 wherein said inbound message segments and said outbound message segments are of generally equivalent length.

15. In a TDM/TDMA radio repeater for repeating TDM/TDMA radio frames, a method for repeating an inbound TDM/TDMA radio frame n based at least in part on the inbound TDM/TDMA radio frame n−1, each inbound TDM/TDMA radio frame comprising p inbound slots, each inbound slot comprising k inbound message segments $i_1$-$i_k$, $i_1$ the earliest, $i_k$ the latest, comprising:

responsive to each inbound slot of the inbound TDM/TDMA radio frame n−1:

(a) transmitting an outbound slot comprising k outbound message segments $o_1$-$o_k$, $o_1$ the earliest, $o_k$ the latest, each outbound slot outbound message segment $o_2$-$o_k$ based at least in part on the corresponding inbound message segment $i_1$-$i_{k-1}$ of like order so that $o_2$ is based on $i_1$, $o_3$ is based on $i_2$, and so forth, with $o_k$ based on $i_{k-1}$, (b) saving the inbound message segment $i_k$ to provide a saved inbound message segment $i_k$, responsive to each inbound slot of the inbound TDM/TDMA radio frame n:

(c) transmitting an outbound slot comprising k outbound message segments $o_1$-$o_k$, outbound message segment $o_1$ based at least in part on said saved inbound message segment $i_k$ of the corresponding inbound slot of the inbound TDM/TDMA radio frame n−1, each outbound slot outbound message segment $o_2$-$o_k$ based at least in part on the corresponding inbound slot inbound message segment $i_1$-$i_{k-1}$ of like order so that $o_2$ is based on $i_1$, $o_3$ is based on $i_2$, and so forth, with $o_k$ based on $i_{k-1}$, (d) saving the inbound message segment $i_k$ to form a saved inbound message segment $i_k$.

16. The method of claim 15 wherein said inbound message segments and said outbound message segments are of essentially uniform length.

17. In a TDM/TDMA radio repeater for repeating TDM/TDMA radio frames, a method for repeating an inbound TDM/TDMA radio frame n based at least in part on the inbound TDM/TDMA radio frame n−1, each inbound TDM/TDMA radio frame comprising multiple slots, each slot comprising k message segments, comprising the steps of:

responsive to each inbound slot of the inbound TDM/TDMA radio frame n−1:

(a) storing the last q inbound message segments to form q stored segments, responsive to the corresponding inbound slot of the inbound TDM/TDMA radio frame n:

(b) sending an outbound slot comprising k message segments, the first q message segments based at least in part on said q stored message segments, the remaining message segments based at least in part on the first k-q message segments of the present inbound TDM/TDMA radio frame.

18. The method of claim 17 wherein said inbound message segments and said outbound message segments are of substantially equal length.

19. The method of claim 18 wherein q=1.

20. In a TDM/TDMA radio repeater for repeating TDM/TDMA radio frames utilizing inbound and outbound TDM/TDMA radio frames, each TDM/TDMA radio frame comprising multiple slots, each slot comprising several messages segments including a most recent message segment, a method for repeating inbound slots, comprising the steps of:

responsive to a typical inbound slot:

(a) sequentially retransmitting all messages segments except a predetermined number of the most recent message segments as outbound message segments;

(b) delaying said predetermined number of the most recent message segments as a delayed portion;

responsive to an inbound slot subsequent to said typical inbound slot:

(c) transmitting said predetermined number of outbound message segments based at least in part on said delayed portion;

(d) sequentially retransmitting all message segments except said predetermined number of the most recent message segments as outbound message segments.

21. The method of claim 20 wherein said message segments are of generally equivalent length.

22. The method of claim 21 wherein said predetermined number equals one.

23. In a TDM/TDMA radio repeater for repeating TDM/TDMA radio frames utilizing inbound and outbound TDM/TDMA radio frames, each TDM/TDMA radio frame comprising multiple slots, each slot comprising n segments, each designated segment$_i$, where i varies from 1-n, segment$_n$ the most recent segment, a method for repeating inbound slots, comprising the steps of:

(a) delaying segment$_1$ of the inbound slot k to form a delayed segment$_1$ of the inbound slot k, (b) and, where i varies from 2-n, delaying segment$_i$ of the inbound slot k to form a delayed segment$_i$ of the inbound slot k and transmitting said delayed segment$_{i-1}$ of the inbound slot k, (c) delaying segment$_1$ of the inbound slot k+1 to form a delayed segment$_1$ of the inbound slot k+1 and transmitting said delayed segment$_n$ of said inbound slot k, (d) and, where i varies from 2-n, delaying segment$_i$ of the inbound slot k+1 to form a delayed segment$_i$ of the inbound slot k+1 and transmitting said delayed segment$_{i-1}$ of the inbound slot k+1.

24. The method of claim 23 wherein said segments are of generally equivalent length.

* * * * *